United States Patent [19]

Aschberger et al.

[11] Patent Number: 4,771,198

[45] Date of Patent: Sep. 13, 1988

[54] ELECTROMAGNET SYSTEM WITH PROTECTION AGAINST OVERHEATING

[75] Inventors: Matthias Aschberger; Karlheinz Färber, both of Giengen; Anton Deininger, Bachhagel, all of Fed. Rep. of Germany

[73] Assignees: The Coca-Cola Company, Atlanta, Ga.; Bosch Siemens Hausgerate GmbH, Fed. Rep. of Germany

[21] Appl. No.: 117,424

[22] Filed: Nov. 2, 1987

Related U.S. Application Data

[63] Continuation of Ser. No. 768,365, Aug. 22, 1985, abandoned.

[30] Foreign Application Priority Data

Aug. 22, 1984 [DE] Fed. Rep. of Germany ....... 3430927

[51] Int. Cl.4 .............................................. H02K 11/00

[52] U.S. Cl. .................................. 310/68 C; 335/142; 361/25

[58] Field of Search .............. 335/142, 281; 310/68 C; 251/129.15; 361/23, 24, 25, 26, 27

[56] References Cited

U.S. PATENT DOCUMENTS

| | | | |
|---|---|---|---|
| 3,152,290 | 10/1964 | Cassano et al. | 335/281 |
| 3,691,425 | 9/1972 | Weyrich et al. | |
| 4,112,405 | 9/1978 | Joseph | 335/142 |
| 4,454,554 | 6/1984 | Coleman | |

FOREIGN PATENT DOCUMENTS

| | | |
|---|---|---|
| 1488992 | 4/1966 | Fed. Rep. of Germany . |
| 2536375 | 8/1975 | Fed. Rep. of Germany . |
| 3120041 | 5/1981 | Fed. Rep. of Germany . |

*Primary Examiner*—H. Broome

*Attorney, Agent, or Firm*—Birch, Stewart, Kolasch & Birch

[57] ABSTRACT

An electromagnetic assembly including an electromagnetic coil wound on a core of ferromagnetically conductive material. A temperature protection circuit includes a fuse which breaks when the electromagnetic assembly becomes overheated. The fuse is thermally coupled to pole pieces of the assembly and is in electrical circuit with the coil.

3 Claims, 1 Drawing Sheet

ELECTROMAGNET SYSTEM WITH PROTECTION AGAINST OVERHEATING

This application is a continuation of application Ser. No. 768,365 filed on Aug. 22, 1985, now abandoned

BACKGROUND OF THE INVENTION

1. Field of the Invention

This invention relates to an electromagnet system having an electromagnetic coil, wherein the wire windings of the exciting coil are supported by a coil form and are insulated from a magnetic flux element made of a ferromagnetically conductive material using a circuit element as a protection against overheating in the exciting circuit.

2. Description of Related Art

Preventive measures against overheating are part of the general state of the art. Thus, such preventive measures against overheating are also used for the exciting windings of electric motors and electromagnets. Either thermal circuit breakers or thermal fuses may be used. Thermal circuit breakers only interrupt power in the case of temperatures exceeding a predetermined limiting value, whereas thermal fuses cause a permanent interruption of the exciting circuit because of destruction resulting from overheating.

In electromagentic exciting coils, the use of such preventive measures is particulary important if such coils are only designed for short-term loads and there is a risk that long-term loads might occur. In this connection, during long-term loads, overheating of the exciting coil would result in the destruction of the wire insulation and, thus, in short-circuits. Therefore, preventive measures against overheating, be it in the form of a thermal circuit breaker or a thermal fuse, are integrated into the exciting coil. The threshold response value for the fuse element is selected to ensure that the critical temperature that would lead to the destruction of the exciting coil is not reached.

If the electromagnetic coil is subjected to such a load that the critical temperatures for the thermal fuse and, thus, the critical temperature for the electromagnet system is not reached, but high temperatures below these limiting values are generated on a relatively continuous basis, the area surrounding the electromagnetic coil, notably the magnetic flux element made of a ferromagnetically conductive material, is heated to high temperatures by the electromagnetic coil. In particular, when this element is placed in a plastic housing, it may lead to undesirable side effects, e.g., scorching. To avoid this, it may be necessary to take preventive measures against overheating in this area also. Based on this knowledge and the state of the art, the object of the invention is to provide an electromagnet system with protection against overheating to ensure in a simple manner that overheating both in the exciting coil and in the area surrounding it is prevented. In this connection, particular attention should be paid to the desire for a simple system and for making it available at a low cost.

SUMMARY OF THE INVENTION

According to the invention, an electromagnet system with fuse protection that completely satisfies these requirements is characterized by the fact that the circuit element acting as a fuse for the protection against overheating is located in the coil form in the area between the electromagnetic exciting coil and the magnetic flux element. In an electromagnetic system incorporating the invention, the circuit element serving as a fuse is coupled thermally both to the exciting coil and to the magnetic flux element of the electromagnet system.

The limiting value for the temperature of this fuse element will lie between the limiting values for the critical temperature of the exciting coil and the critical temperature for the area surrounding it. This limiting value shall particularly be established in the vicinity of the critical temperature of the area surrounding the coil, because when the electromagnet system is placed under load, one must assume that a temperature gradient will occur between the temperature of the exciting coil and that of the magnetic flux element. Since both functional elements act on the fuse element, the various incidents that may lead to overheating can be taken into account. For example, if the magnetic flux element is relatively cold, the threshold response value of the fuse element will be reached as the mean value, whenever the temperature in the exciting coil approaches the critical value. However, if the magnetic flux element is heated to a temperature which, with respect to the coil-surrounding area, e.g., a plastic housing, shall not be exceeded, any overheating of the exciting coil will cause the fuse element to blow.

Also, the arrangement of the fuse element in the coil core is advantageous because the fuse element does not interfere with the exciting coil in terms of space. It is to be assigned to the exciting coil after it has been manufactured, thereby simplifying its replacement.

In particular, in an electromagnet system with a magnetic flux element designed to extend with its end face abutting against the coil form, it is advisable within the framework of the measures advocated by the present invention that the circuit element used as a fuse for protection against overheating be located in a flange at the end of the coil form. In this case, the coil form would have to be of a somewhat heavier design.

According to a preferred embodiment of the invention, the electromagnet system embodying the invention is characterized by the fact that a thermal fuse is destroyed when the limiting value of the overheating protection is exceeded is provided as a circuit element acting as a fuse. In many cases, one may assume that a general malfunction or a permanent impairment of the electromagnet system exists on the fuse element when the threshold response value is reached. In this case, it would be difficult to use a thermal circuit breaker which, following cooling, would return the electromagnet system to its operational state.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

A specific embodiment of the invention will now be described in detail with réference to the accompanying drawings which are given by way of illustration only, and thus are not limitative of the present invention and wherein.

DESCRIPTION OF PREFERRED EMBODIMENT

Figure 1:
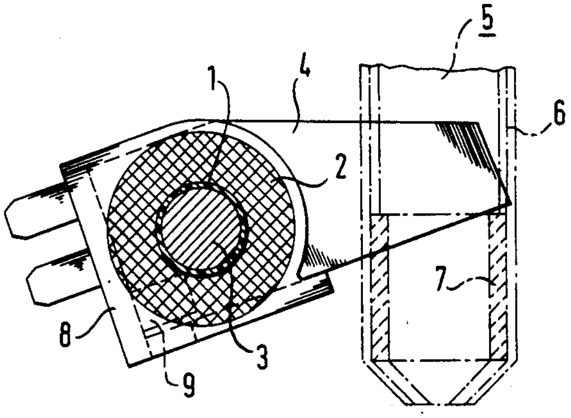
FIG. 1 is a schematic side view, partly in section, of the electromagnet system.
Figure 2:
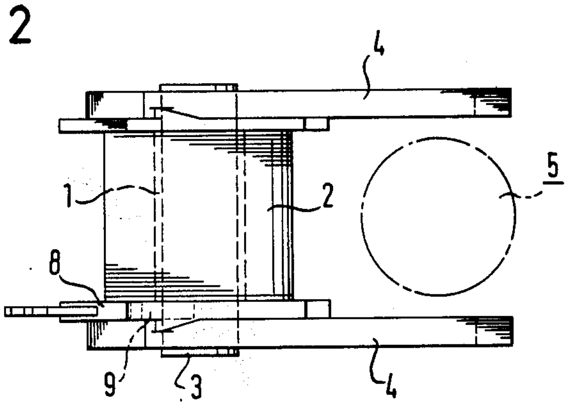
FIG. 2 is a schematic plan view of this electromagnet system.

An electromagnetic coil 2 mounted ona coil form 1 is placed on a cylindrical core 3 made of a ferromagnetically conductive material. There are disposed on the ends of the coil form 1 and, thereby, on the electromagnetic coil 2, two flat edgewise pole pieces 4 also of a ferromagnetically conductive material having cylindrical apertures in which the cylindrical core 3 is wedged. The free ends of the flat edgewise pole pieces project into the area of a dosing valve 5 for measuring beverage concentrates such as used in machines for mixing refreshment beverages. A part of the valve spool 6 of this dosing unit 5 is made of a ferromagnetically conductive material and can thus be influenced as a dipper armature 7 between the free ends of the flat edgewise pole pieces 4. In the area of the electromagnetic coil 2, the flat edgewise pole pieces overlap the cross section of this electromagnetic coil 2, so that most of the magnetic fields emerging from the ends of this coil are captured. A thermal fuse 9 is disposed in a recess of the side flange 8 of the coil form 1 so that it is thermally coupled to the adjacent flat edge pole piece 4 of the magnetic flux element 3, 4 and to the electromagnetic coil 2. The exciting current for the electromagnetic coil 2 is routed by way of this thermal fuse 9.

The thermal fuse 9 may be designed as a fuse or constructed using a semiconductor that is destroyed when the limiting value of the temperature is reached.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnet system having an electromagnetic coil, said system comprising:

an insulated coil form for supporting said electromagnetic coil;

a core element of a ferromagnetically conductive material inserted within said insulated coil form;

a pair of substantially flat ferromagnetically conductive pole pieces overlying the ends of said insulated coil form and having cylindrical apertures formed therein for receiving the respective end of said core element, a portion of said pole pieces extending beyond said coil form, said flat pole pieces and said core element forming a magnetic flux element; and circuit means, located in a flange of said insulated coil form between and thermally coupled to both said electromagnetic coil and an adjacent pole piece of the magnetic flux element, for preventing overheating of said electromagnetic coil and the pole pieces of said magnetic flux element.

2. An electromagnet system according to claim 1, wherein said circuit means is a thermal fuse, which is destroyed when the limiting value of the overheating protection is exceeded.

3. An electromagnet system according to claim 1, further comprising:

a dipper armature made of ferromagnetically conductive material located between free ends of said flat pole pieces, said dipper armature adapted to be used as a dosing valve, for measuring beverage concentrate.

* * * * *